US012579015B2

(12) United States Patent
Menichelli et al.

(10) Patent No.: US 12,579,015 B2
(45) Date of Patent: Mar. 17, 2026

(54) METHOD FOR UPDATING RISK ANALYSIS PARAMETERS OF A TECHNICAL SYSTEM

(71) Applicants: ION BEAM APPLICATIONS SA, Louvain-la-Neuve (BE); Friedrich-Alexander-Universität Erlangen-Nürnberg, Erlangen (DE)

(72) Inventors: David Menichelli, Louvain-la-Neuve (BE); Andreas Lämmerzahl, Louvain-la-Neuve (BE); Christoph Bert, Louvain-la-Neuve (BE); Dominik Kornek, Louvain-la-Neuve (BE)

(73) Assignee: ION BEAM APPLICATIONS SA, Louvain-la-neuve (BE)

( * ) Notice: Subject to any disclaimer, the term of this patent is extended or adjusted under 35 U.S.C. 154(b) by 75 days.

(21) Appl. No.: 18/518,923

(22) Filed: Nov. 24, 2023

(65) Prior Publication Data

US 2024/0176687 A1 May 30, 2024

(30) Foreign Application Priority Data

Nov. 25, 2022 (EP) ..................................... 22209727

(51) Int. Cl.
*G06F 11/07* (2006.01)
*G06F 11/00* (2006.01)
(52) U.S. Cl.
CPC ........ *G06F 11/008* (2013.01); *G06F 11/0766* (2013.01)

(58) Field of Classification Search
CPC .. G06F 11/008; G06F 11/0766; G06F 11/079; G06F 11/0793
USPC .................................. 714/1, 25, 26, 27, 38.1
See application file for complete search history.

(56) References Cited

U.S. PATENT DOCUMENTS

| | | | | |
|---|---|---|---|---|
| 7,937,679 | B2 * | 5/2011 | Mariani | .................. G06F 30/33 716/112 |
| 2022/0222071 | A1 * | 7/2022 | Dell'Osa | ................... G06F 8/77 |
| 2023/0244563 | A1 * | 8/2023 | Menichelli | .......... G06F 11/0793 714/37 |
| 2023/0315954 | A1 * | 10/2023 | Das | ......................... G06F 30/27 703/14 |
| 2023/0342538 | A1 * | 10/2023 | Lorenzini | ............. G06F 30/398 |

OTHER PUBLICATIONS

Chunsheng Yang et al., "APU FMEA Validation Using Operation and Maintenance Data," Institute for Information Technology, National Research Council Canada Ottawa, Annual Conference of the Prognostics and Health Management Society (Technical Brief), 2009, pp. 1-6.

(Continued)

*Primary Examiner* — Chae M Ko
(74) *Attorney, Agent, or Firm* — Finnegan, Henderson, Farabow, Garrett & Dunner, LLP

(57) ABSTRACT

A computer-based method for updating risk analysis parameters of a proactive risk analysis of a technical system, such as of an FMEA analysis for example. The method uses incident report data obtained during posterior operation of the technical system, compares these incident report data with data of the proactive risk analysis, and updates the said risk analysis parameters in function of said comparison.

11 Claims, 4 Drawing Sheets

(56)    References Cited

OTHER PUBLICATIONS

Failure mode and effects analysis, Wikipedia The Free Encyclope-
dia, Dec. 4, 2023, Retrieved from "https://en.wikipedia.org/wlindex.
php?title=Failure_mode_and_effects_analysis&01did=
1122569547", 7 pgs.
European Search Report for counterpart European Application No.
EP22209727, dated Apr. 20, 2023, 5 pages.

* cited by examiner

| Process step | Substep | Failure mode | Occurrence (O) | Detectability (D) |
|---|---|---|---|---|
| Step 1 | Substep 1,1 | FM 1,1 | 8 | 2 |
| Step 1 | Substep 1,2 | FM 1,2 | 6 | 5 |
| Step 2 | | FM 2,1 | 7 | 1 |
| Step 3 | Substep 3,1 | FM 3,1 | 1 | 9 |
| Step 3 | Substep 3,2 | FM 3,2 | 5 | 2 |
| Step 3 | Substep 3,3 | FM 3,3 | 6 | 6 |

Fig. 1

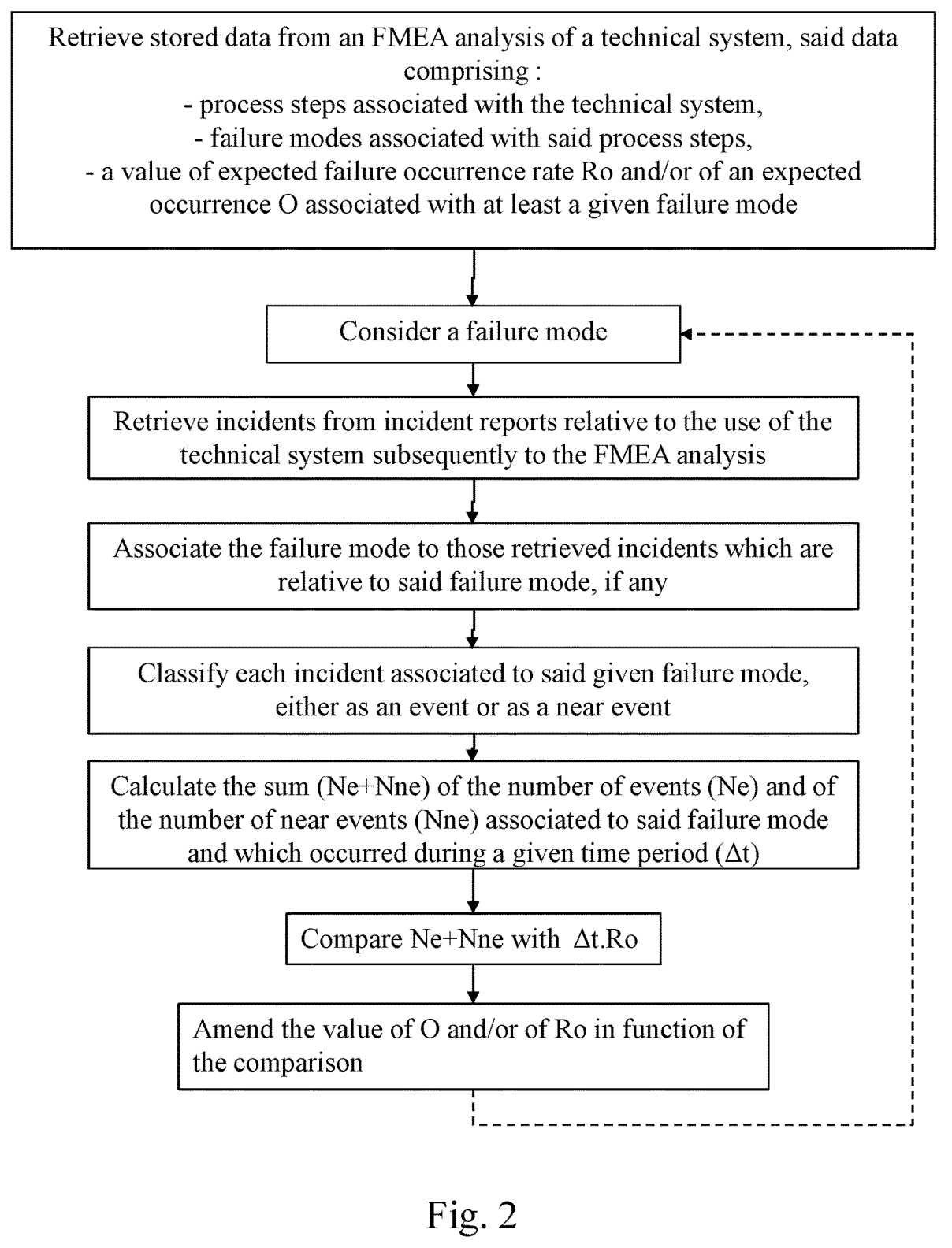

Retrieve stored data from an FMEA analysis of a technical system, said data comprising :
- process steps associated with the technical system,
- failure modes associated with said process steps,
- a value of expected failure occurrence rate Ro and/or of an expected occurrence O associated with at least a given failure mode Consider a failure mode Retrieve incidents from incident reports relative to the use of the technical system subsequently to the FMEA analysis Associate the failure mode to those retrieved incidents which are relative to said failure mode, if any Classify each incident associated to said given failure mode, either as an event or as a near event Calculate the sum (Ne+Nne) of the number of events (Ne) and of the number of near events (Nne) associated to said failure mode and which occurred during a given time period (Δt)

Compare Ne+Nne with  Δt.Ro

Amend the value of O and/or of Ro in function of the comparison

Fig. 2

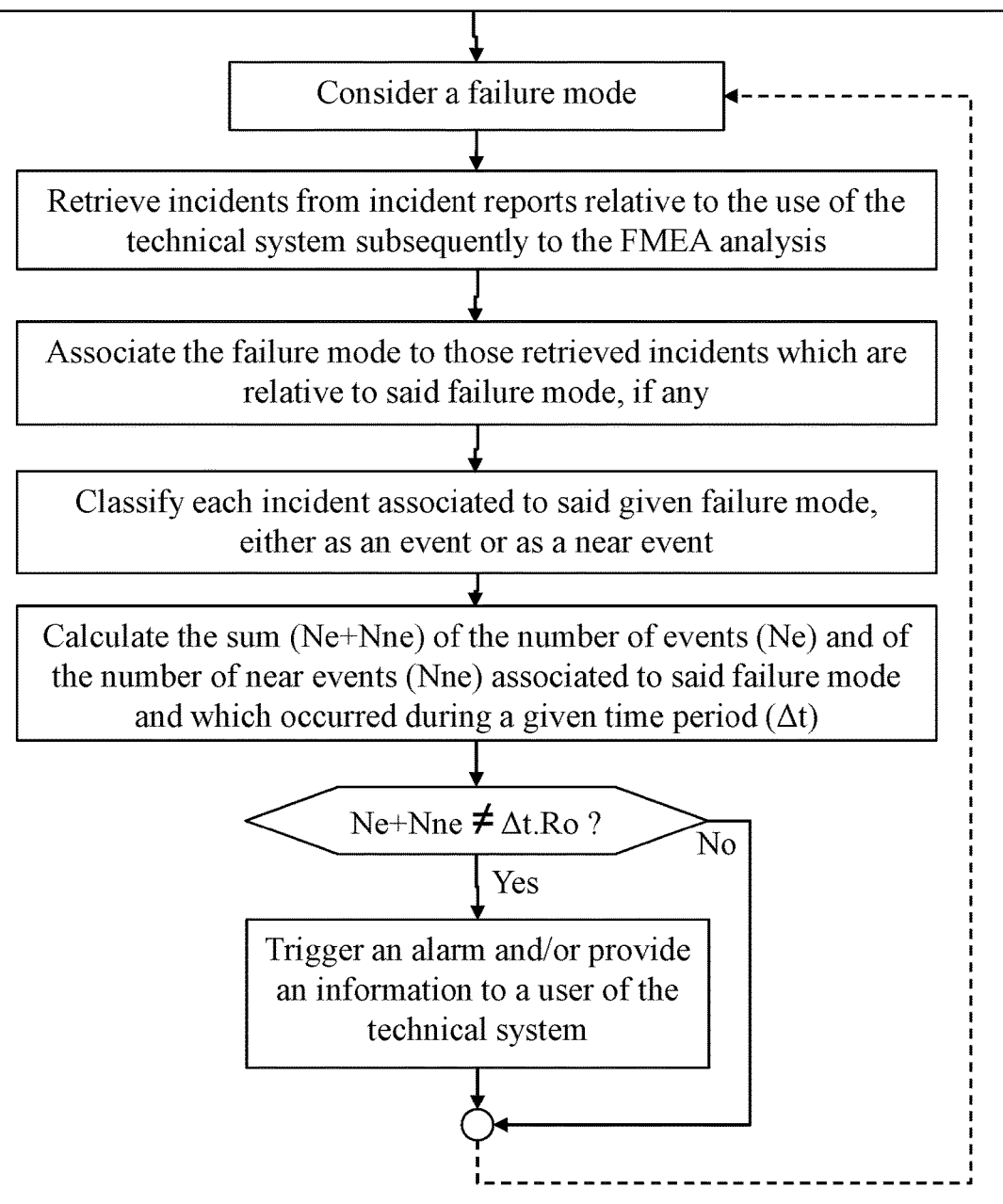

Retrieve stored data from an FMEA analysis of a technical system, said data comprising :
- process steps associated with the technical system,
- failure modes associated with said process steps,
- a value of expected failure occurrence rate Ro and/or of an expected occurrence O associated with at least a given failure mode Consider a failure mode Retrieve incidents from incident reports relative to the use of the technical system subsequently to the FMEA analysis Associate the failure mode to those retrieved incidents which are relative to said failure mode, if any Classify each incident associated to said given failure mode, either as an event or as a near event Calculate the sum (Ne+Nne) of the number of events (Ne) and of the number of near events (Nne) associated to said failure mode and which occurred during a given time period ($\Delta$t)

Ne+Nne $\neq$ $\Delta$t.Ro ?

No

Yes

Trigger an alarm and/or provide an information to a user of the technical system

Fig. 3

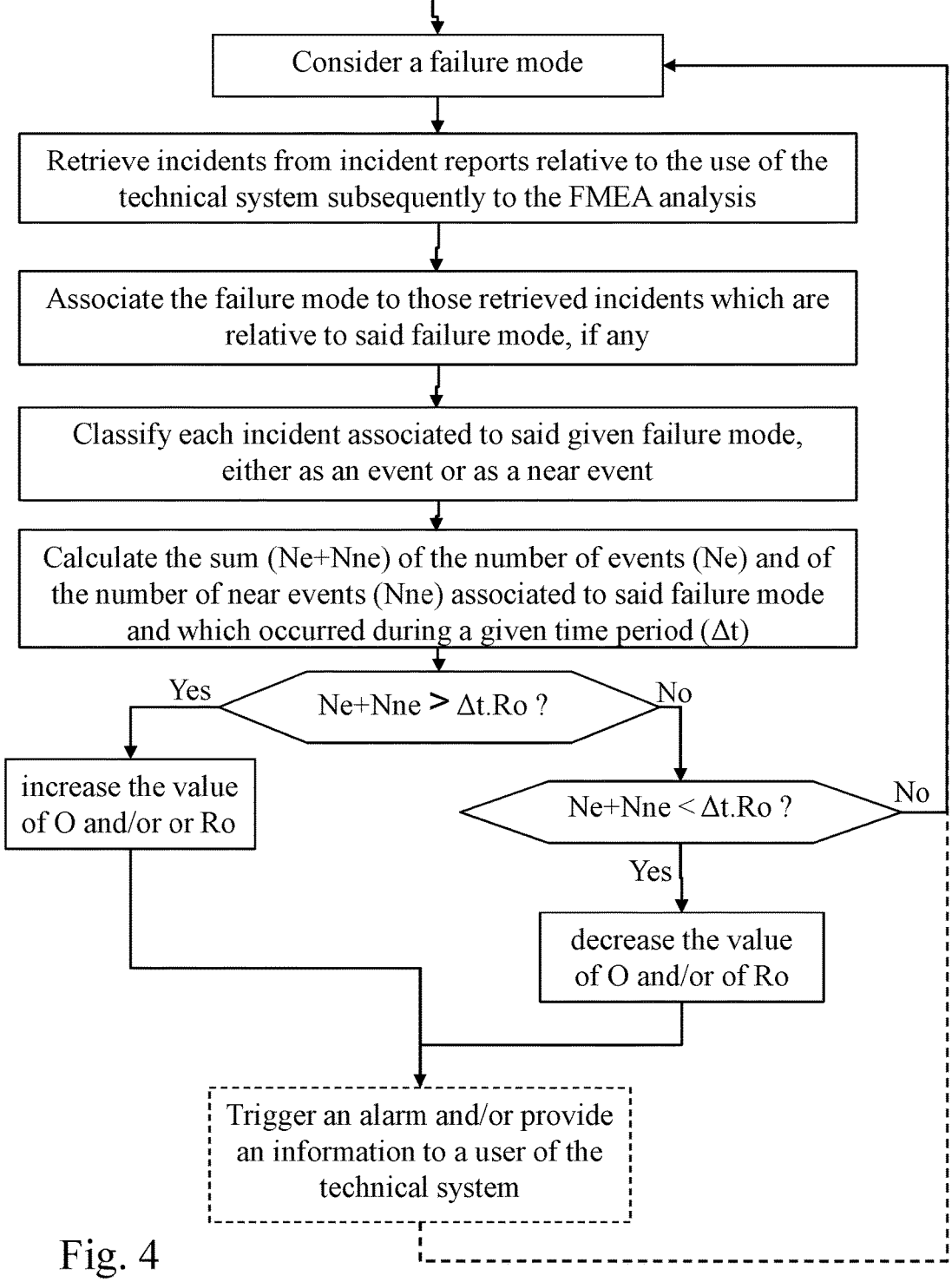

Retrieve stored data from an FMEA analysis of a technical system, said data comprising :
- process steps associated with the technical system,
- failure modes associated with said process steps,
- a value of expected failure occurrence rate Ro and/or of an expected occurrence O associated with at least a given failure mode Consider a failure mode Retrieve incidents from incident reports relative to the use of the technical system subsequently to the FMEA analysis Associate the failure mode to those retrieved incidents which are relative to said failure mode, if any Classify each incident associated to said given failure mode, either as an event or as a near event Calculate the sum (Ne+Nne) of the number of events (Ne) and of the number of near events (Nne) associated to said failure mode and which occurred during a given time period (Δt)

Ne+Nne > Δt.Ro ?

Yes     No increase the value of O and/or or Ro

Ne+Nne < Δt.Ro ?    No

Yes decrease the value of O and/or of Ro

Trigger an alarm and/or provide an information to a user of the technical system

Fig. 4

METHOD FOR UPDATING RISK ANALYSIS PARAMETERS OF A TECHNICAL SYSTEM

REFERENCE TO RELATED PATENT APPLICATION

This application claims priority to European Patent Application No. 22209727.1, filed on Nov. 25, 2022, which is hereby incorporated by reference in its entirety.

TECHNICAL FIELD

The present disclosure relates to the field of risk analysis of technical systems, more particularly of technical systems which are used in the field of healthcare such as radiation therapy for example.

The present disclosure more particularly relates to a method for updating risk analysis parameters of a technical system and to a computer program product storing executable instructions for executing such method.

DESCRIPTION OF PRIOR ART

Risk analysis is well known in several industries and a number of methods and computer-based tools have been developed to assist a user in performing such analysis. Currently, Failure Modes and Effects Analysis (hereafter "FMEA"), which is a predictive risk assessment method, is frequently used to this end. This known method allows a user to associate a failure mode of a technical system to risk analysis parameters such as the well known parameters of occurrence (hereafter "O") and detectability (hereafter "D") of a failure mode and/or of corresponding parameters such as failure occurrence rate (Ro) and failure detection rate (Rd).

The problem with such analysis is that the values of O, D, Ro and Rd are estimated by a human being based on his personal judgement and generally before actual operation of the technical system, so that they may not always correspond to the reality and hence result in a lack of accuracy of the FMEA analysis. Various methods have therefore been developed to retroactively correct these parameters.

Habraken (Kessels-Habraken, M, Tjerk Schaaf, J. Jonge, C Rutte, and K Kerkvliet. *"Integration of Prospective and Retrospective Methods for Risk Analysis in Hospitals."*— International Journal for Quality in Health Care: Journal of the International Society for Quality in Health Care/ISQua 21—Dec. 1, 2009: 427-32) presents a comparison between prospective and retrospective analysis of the same process. Failure modes are aggregated and the number of expected process deviations are compared with reported process deviations. However, attempts were neither made to evaluate individual failure modes, nor to correct the prospective analysis. Detectability and/or failure detection rate were not considered either.

In Paradis (Paradis, Kelly C., Katherine Woch Naheedy, Martha M. Matuszak, Rojano Kashani, Pamela Burger, and Jean M. Moran. *"The Fusion of Incident Learning and Failure Mode and Effects Analysis for Data-Driven Patient Safety Improvements."*—Practical Radiation Oncology, no. 0—Mar. 19, 2020), the FMEA technique is used to investigate reported incidents. However, a comparison between reported incidents and a corresponding prospective risk analysis is not discussed in this paper.

Yang (Yang, F., N. Cao, L. Young, J. Howard, W. Logan, T. Arbuckle, P. Sponseller, T. Korssjoen, J. Meyer, and E. Ford. *"Validating FMEA Output against Incident Learning*

*Data: A Study in Stereotactic Body Radiation Therapy."*— Medical Physics 42, no. 6—June 2015: 2777-85) anticipates the idea to validate FMEA prospective results against retrospective incident data. However, they simply compare the anticipated failure modes with the reported incidents to see which kind of failures/incidents were missing in the data sets. US20080275747A1 describes an incident report analysis apparatus able to carry out a FMEA with incident data. The apparatus includes an incident input unit for inputting the incident report, a report database for accumulating the incident reports, a screening unit for screening only the incident reports of which the effect has reached the patient, an FMEA table and a data table for storing the occurrence, detectability, severity, and crisis rate. However, it is problematic that only "events" are taken into account for the update of the occurrence and the detectability factors of the FMEA. Thus, many opportunities to prevent an accident or adverse incident are lost. In addition, it is problematic that the method of US20080275747A1 does not offer a way to validate O and D independently; it basically compares the reported events (incidents with level Ob or higher in the language of this patent) with the expectation (occurrence probability x probability that the failure is not detected). What is validated is the pair (O,D).

SUMMARY

It is an object of the present disclosure to provide a computer-based method to update risk analysis parameter(s) of a technical system which addresses the problems of the known methods.

Some of the disclosed embodiments are defined by the independent claims. The dependent claims define advantageous embodiments.

According to some embodiments, there is provided a computer-based method for updating risk analysis parameters associated to an FMEA risk analysis of a technical system, the method comprising the steps of:

a) Retrieving stored data from the FMEA analysis of the technical system, said stored data including:
  a set of process steps associated with the technical system,
  a set of failure modes associated with said process steps,
  a value of an expected failure occurrence rate (Ro) and/or of an occurrence (O) associated with at least one given failure mode of said set of failure modes;

b) For the at least one given failure mode of said set of failure modes:
  i. Retrieving incidents from incident reports relative to the use of the technical system subsequently to said FMEA analysis;
  ii. Associating said given failure mode to those retrieved incidents which are relative to said given failure mode, if any;
  iii. Classifying each incident associated to said given failure mode, either as an event or as a near event, or optionally as a non-event;
  iv. Calculating the sum (Ne+Nne) of the number of events (Ne) and of the number of near events (Nne) associated to said given failure mode and which occurred during a given time period ($\Delta t$);
  v. Comparing said sum (Ne+Nne) with the value of $\Delta t \cdot Ro$;
  vi. In the stored data of the FMEA analysis of the technical system, amend the value of the occurrence rate (Ro) and/or of the occurrence (O) associated to said given failure mode in function of the result of the comparison of step b)v.

As is generally known, the value of occurrence (O) associated with a failure mode is for example a ranking number reflecting the likelihood that the failure mode and its associated cause will be present in the technical system under study. This ranking number for (O) may for example be a number from 1 to 10 wherein 1 represents a low likelihood that the failure mode and its associated cause will be present in the system under study and wherein 10 represents a high likelihood that the failure mode and its associated cause will be present in the system under study.

The expected failure occurrence rate or failure occurrence rate (Ro) associated with a failure mode is an expected rate at which the failure mode will be present in the system under study (expressed in number of times per unit of time). As will be detailed hereafter, Ro is a function of O for a given technical system and a given failure mode and vice-versa, so that the value of Ro may be determined in function of the value of O and vice-versa.

With a method according to some embodiments, the value of O and/or of Ro, which are initially set more or less subjectively (or derived one from another) by a user of the technical system, are thereafter automatically adjusted in function of the real behavior of the system. The value of O and/or of Ro are moreover automatically adjusted by taking also into account near events, which often precede damage producing events, but were ignored in conventional systems and methods because no injury, damage, or loss actually occurred.

In the context of the present disclosure, an "event" means something that happened within the technical system during its operational use (sometimes called an "incident") and which resulted in the technical system having an unwanted effect. If the technical system is for example a medical device to treat a patient, an event may for example be something that happened within the medical device and which resulted in unintended harm to the patient by an act of commission or omission by the medical device rather than by the underlying disease or condition of the patient or by treatment-related side effects.

In the context of the present disclosure, a "near event" means something that happened within the technical system during its operational use (sometimes also called an "incident") and which could have resulted in the technical system having an unwanted effect, but wherein the unwanted effect eventually didn't occur, for example because preventive measures were effectively applied. If the technical system is for example a medical device to treat a patient, a near event may for example be something that happened within the medical device and which could have resulted in unintended harm to the patient but which eventually didn't reach the patient and was hence without consequence for the patient.

In the context of the present disclosure, a "non-event" means something that happened within the technical system during its operational use (sometimes also called an "incident") and which is neither an event nor a near-event, such as a false alarm for example.

In some embodiments, in step b)iii of a method, either each incident associated to said given failure mode is classified as an event or as a near event, or each incident associated to said given failure mode is classified as an event or as a near event or as a non-event.

The value of O and/or of Ro are moreover automatically adjusted independently from other risk parameters associated to the system such as D and/or Rd for example.

This ultimately results in a more accurate risk analysis of the technical system under study, which allows users and/or designers to take better preventive and/or corrective measures to improve the safety of the technical system. Such measures may for example be the addition of barriers and/or preventions to the failure modes associated to the technical system. The method according to disclosed embodiments allows furthermore to perform such measures iteratively, namely by repeating the method several times.

In some embodiments of the method, step b) further comprises a step:

b)vii. Triggering an alarm and/or providing an information to a user of the technical system if (Ne+Nne) $\neq \Delta t \cdot Ro$ Triggering such alarm and/or providing an information to a user in case the total number of reported events and near events associated with a given failure mode is different from the (previously) expected total number of events and near events is of course useful for the user to take appropriate preventive and/or corrective measures.

In some embodiments of the method, in step b)vi, the value of the occurrence (O) associated to said given failure mode is amended by either increasing the value of the occurrence (O) if (Ne+Nne) is greater than $\Delta t \cdot Ro$, or by decreasing the value of the occurrence (O) if (Ne+Nne) is smaller than $\Delta t \cdot Ro$, and/or in step b)vi, the value of the occurrence rate (Ro) associated to said given failure mode is amended by either increasing the value of the occurrence rate (Ro) if (Ne+Nne) is greater than $\Delta t \cdot Ro$, or by decreasing the value of the occurrence rate (Ro) if (Ne+Nne) is smaller than $\Delta t \cdot Ro$.

This reflects in more detail how the values of O and/or of Ro are amended in function of the comparison between the total number of reported events and near events associated with a given failure mode and the number of expected events and near events. Amending these values as indicated results in a more accurate risk analysis of the technical system under study.

In some embodiments of the method, step a) further includes retrieving stored data from the FMEA analysis of the technical system, said stored data including a value of an expected failure detection rate (Rd) and/or of a detectability (D) associated with the at least one given failure mode of said set of failure modes, and step b)v further includes the step of comparing the number of near events (Nne) with the value of $\Delta t \cdot Rd$ and/or of comparing the number of events (Ne) with the value of $\Delta t \cdot (Ro-Rd)$, and step b)vi further includes the step of, in the stored data of the FMEA analysis of the technical system, amending the value of the expected failure detection rate (Rd) and/or of the detectability (D) associated to said given failure mode in function of the result of the comparison of step b)v.

As is generally known, the value of detectability (D) is a ranking number reflecting the likelihood that a failure mode will be detected before it reaches the end-user of the technical system under study. This ranking number for (D) may for example be a number from 1 to 10 wherein 0 represents a high likelihood that the failure mode will be detected before it reaches the end-user of the system and 10 represents a low likelihood that that the failure mode will be detected before it reaches the end-user of the system.

The expected failure detection rate or failure detection rate (Rd) is an expected rate at which a failure mode will be detected before it reaches the end-user of the system under study (expressed in number of times per unit of time). As will be detailed hereafter, Rd is a function of D for a given technical system and a given failure mode and vice-versa, so that the value of Rd may be determined in function of the value of D and vice-versa.

With such an embodiment of a method, the value of D and/or of Rd, which are initially set more or less subjectively (or derived one from another) by a user of the technical system, are thereafter automatically adjusted in function of the real behavior of the system. The value of D and/or of Rd are moreover automatically adjusted by taking also into account near events, which often precede damage producing events, but were ignored in conventional systems and methods because no injury, damage, or loss actually occurred.

In some embodiments of the method, step b) further comprises a step:

b)viii Triggering an alarm and/or providing an information to a user of the technical system if $Nne \neq \Delta t \cdot Rd$ and/or if $Ne \neq \Delta t \cdot (Ro-Rd)$.

In some embodiments of the method, in step b)vi, the value of detectability (D) associated to said given failure mode is amended by either decreasing the value of the detectability (D) if Nne is greater than $\Delta t \cdot Rd$, or by increasing the value of the detectability (D) if Nne is smaller than $\Delta t \cdot Rd$, and/or by either increasing the value of the detectability (D) if Ne is greater than $\Delta t \cdot (Ro-Rd)$, or by decreasing the value of the detectability (D) if Ne is smaller than $\Delta t \cdot (Ro-Rd)$, and/or, in step b)vi, the value of the expected failure detection rate (Rd) associated to said given failure mode is amended by either increasing the value of the expected failure detection rate (Rd) if Nne is greater than $\Delta t \cdot Rd$, or by decreasing the value of the expected failure detection rate (Rd) if Nne is smaller than $\Delta t \cdot Rd$, and/or by either decreasing the value of the expected failure detection rate (Rd) if Ne is greater than $\Delta t \cdot (Ro-Rd)$, or by increasing the value of the expected failure detection rate (Rd) if Ne is smaller than $\Delta t \cdot (Ro-Rd)$.

This reflects in more detail how the values of D and/or of Rd are amended in function of the comparison between the number of reported events and/or near events associated with a given failure mode and/or the number of expected events and/or of near events. Amending these values as indicated results in a more accurate risk analysis of the technical system under study.

In some embodiments of the method, the step b)ii of associating a given failure mode to those retrieved incidents which are relative to said given failure mode, if any, is performed by requesting a user to establish and to input said associations.

In some embodiments of the method, the step b)iii of classifying each incident associated to a given failure mode, either as an event or as a near event, is performed by requesting a user to establish and to input said classification.

It is another object of the present disclosure to provide a computer program product storing executable instructions, which when executed by a computer, cause the computer to perform a method as described herein.

SHORT DESCRIPTION OF THE DRAWINGS

These and further aspects of the present disclosure will be explained in greater detail by way of examples and with reference to the accompanying drawings in which:

FIG. 1 shows a an exemplary FMEA table of an exemplary technical system to which a method can be applied, consistent with disclosed embodiments;

FIG. 2 shows a flow diagram of an exemplary embodiment of a method, consistent with disclosed embodiments;

FIG. 3 shows a flow diagram of another exemplary embodiment of a method, consistent with disclosed embodiments;

FIG. 4 shows a flow diagram of yet another exemplary embodiment of a method, consistent with disclosed embodiments.

The drawings of the figures are neither drawn to scale nor proportioned. Generally, similar or identical components are denoted by the same reference numerals in the figures.

DETAILED DESCRIPTION OF EMBODIMENTS

Reference will now be made to some particular embodiments of the present disclosure, examples of which are illustrated in the accompanying figures. The accompanying figures are intended to provide a better understanding of the embodiments. They show schematics of embodiments and serve in conjunction with the description to explain principles and concepts of the disclosed subject matter.

According to a first aspect of the present disclosure, there is provided a computer-based method for updating risk analysis parameters associated to a risk analysis of a technical system, more particularly of an FMEA analysis of a technical system.

As used herein, the terms "computer-based", "generating", "determining" or "configuring" are meant to refer to the action and/or processes of a computer that processes and/or transforms data into other data. The term "computer" is meant to designate any electronic device with data processing capabilities. The term "module" is meant to refer to a processor and/or a memory unit storing computer readable instructions.

The term "technical system" is meant to designate any technical system with a plurality of technical components possibly interacting with each other. Exemplary technical systems for use herein include, but are not limited to, healthcare technical systems or power plants. Preferably, the technical system for use herein is a healthcare technical system, in particular for clinical use such as for example a particle therapy system.

FIG. 1 shows a an exemplary FMEA table of an exemplary technical system to which a method can be applied, consistent with disclosed embodiments. As shown in this table, the technical system performs three process steps when in operation, each step having sub-steps as indicated. To each step or sub-step are associated a number of failure modes and to each failure mode is associated a value of occurrence (O) and optionally a value of detectability (D). The values of O and D are supposed to be initial values as for example determined and input initially by a user of the method. As will become clear, O and optionally D are the risk parameters whose values that will be re-evaluated retrospectively by a method according to some embodiments, based on incidents reports.

Alternatively to O and optionally D, or in addition to these parameters, the FMEA table may contain a value of expected failure occurrence rate (Ro) and optionally a value of expected failure detection rate (Rd) associated to a failure mode. In that case, the values of Ro and of Rd are supposed to be initial values as for example determined and input initially by a user of the method, and, as will also become clear, Ro and optionally Rd are risk parameters whose values will be re-evaluated retrospectively by a method according to some embodiments, based on incidents reports.

It is to be noted that Ro is a function of O for a given technical system and a given failure mode and vice-versa, so that the value of Ro may be determined in function of the value of O and vice-versa, and that Rd is a function of D for a given technical system and a given failure mode and vice-versa, so that the value of Rd may be determined in function of the value of D and vice-versa.

The functional relationship between Ro and O as well as between Rd and D are as follows and take into account the fact that in general a certain process step or sub-step of the technical system under study is not performed for all runs of the technical system, and that other process steps or sub-steps could be repeated more than once:

O is associated to an occurrence probability Pocc, for instance the probability that a failure mode occurs during a run of the technical system: Pocc=Pocc(O);

D is associated to a non-detection probability, i.e. the probability Pmiss that the failure mode will be not detected before generating its effect: Pmiss=Pmiss(D).

Under the reasonable assumption that O and D are statistically independent, we have that: $Ro=Pocc \cdot T \cdot R \cdot F$ and $Rd=Ro \cdot (1-Pmiss)$, wherein:

T ("throughput") is the number of runs of the technical system per unit of time $\Delta t$ (e.g. number of runs per year);

R is the average number of repetitions of the process step or sub-step for one run of the technical system; and F is the fraction of runs of the technical system during which the process step is performed (typically a % value).

Values of T, R and F provide a statistical description of the process steps or sub-steps performed by the technical system to which the method is applied and can for example be provided (input) by a user before starting the risk analysis.

FIG. 2 shows a flow diagram of an exemplary embodiment of a method, consistent with disclosed embodiments. As shown in the example of FIG. 2 the method is a computer-based method for updating risk analysis parameters associated to an FMEA risk analysis of a technical system, and it comprises the steps of:

a. Retrieving stored data from the FMEA analysis of the technical system, said stored data including:

a set of process steps associated with the technical system, a set of failure modes associated with said process steps, a value of an expected failure occurrence rate (Ro) and/or of an occurrence (O) associated with at least one given failure mode of said set of failure modes;

In this step, the values of expected failure occurrence rate (Ro) and/or of an occurrence (O) are initial values as for example set and input initially by a user in charge of performing the risk analysis. In some examples, the initial value of Ro is set and input by the user and O can be calculated by the user or by the computer as explained hereinabove, or vice-versa. Alternatively, these values may be values as amended by the method itself (see step b.vi) in case of an iterative use of the method.

b. For the at least one given failure mode of said set of failure modes:

i. Retrieving incidents from incident reports relative to the use of the technical system subsequently to said FMEA analysis;

ii. Associating said given failure mode to those retrieved incidents which are relative to said given failure mode, if any;

iii. Classifying each incident associated to said given failure mode, either as an event or as a near event, or optionally as a non-event;

iv. Calculating the sum (Ne+Nne) of the number of events (Ne) and of the number of near events (Nne) associated to said given failure mode and which occurred during a given time period ($\Delta t$);

v. Comparing said sum (Ne+Nne) with the value of $\Delta t \cdot Ro$;

vi. In the stored data of the FMEA analysis of the technical system, amend the value of the occurrence rate (Ro) and/or of the occurrence (O) associated to said given failure mode in function of the result of the comparison of step b)v.

An incident report is, as its name indicates, a report containing information relative to incidents which occurred during an operation of the technical system. Such an incident report can be created in different ways. It may for instance be created by a person who discovered the incident(s) and who inputs corresponding incident data directly into a computer file via a user interface. It may alternatively be created by a person going through available incident reports (paper forms, emails . . . ) and who inputs corresponding incident data into a computer file via a user interface. It may alternatively be created by a software which parses available incident reports (pdf forms, emails . . . ) and/or which reads incident data exported from other computer systems and which automatically creates a computer file with said incident data.

In some examples, the step b)i of retrieving incidents from incident reports may be a step of retrieving incidents from said computer files by the computer system executing the method.

In some examples, the step b)ii of associating a given failure mode to those retrieved incidents which are relative to said given failure mode, if any, is performed by requesting a user to establish and to input said associations via a user interface. The association can for example be stored in the form of a first table whose data are accessible to the computer executing the method.

In some examples, the step b)iii of classifying each incident associated to a given failure mode, either as an event or as a near event, is performed by requesting a user to establish and to input said classification via a user interface. The association can for example be stored in the form of a second table whose data are accessible to the computer executing the method.

It is to be noted that the time period ($\Delta t$) used herein is the same time period as used for the evaluation of the throughput "T" in the above formula used to calculate Ro and may for example be a period of one month or of several months, typically of one year.

FIG. 3 shows a flow diagram of another exemplary embodiment of a method, consistent with disclosed embodiments. In this example, step b) of the method further comprises a step:

b)vii. Triggering an alarm and/or providing an information to a user of the technical system if (Ne+Nne) is different from $\Delta t \cdot Ro$.

FIG. 4 shows a flow diagram of yet another exemplary embodiment of a method, consistent with disclosed embodiments. In this example, in step b)vi, the value of the occurrence (O) associated to said given failure mode is amended by either increasing the value of the occurrence (O) if (Ne+Nne) is greater than $\Delta t \cdot Ro$, or by decreasing the value of the occurrence (O) if (Ne+Nne) is smaller than $\Delta t \cdot Ro$, and/or, in step b)vi, the value of the occurrence rate (Ro) associated to said given failure mode is amended by either increasing the value of the occurrence rate (Ro) if (Ne+Nne) is greater than $\Delta t \cdot Ro$, or by decreasing the value of the occurrence rate (Ro) if (Ne+Nne) is smaller than $\Delta t \cdot Ro$.

In some examples, the computer may amend the value of Ro associated with said given failure mode of said set of failure modes and calculate the corresponding value of O with the formula disclosed hereinabove, or vice versa.

In some examples of a method according to some embodiments:

step a) further includes retrieving stored data from the FMEA analysis of the technical system, said stored data including a value of an expected failure detection rate (Rd) and/or of a detectability (D) associated with the at least one given failure mode of said set of failure modes;

step b)v further includes the step of comparing the number of near events (Nne) with the value of $\Delta t \cdot Rd$ and/or of comparing the number of events (Ne) with the value of $\Delta t \cdot (Ro-Rd)$, step b)vi further includes the step of, in the stored data of the FMEA analysis of the technical system, amending the value of the expected failure detection rate (Rd) and/or of the detectability (D) associated to said given failure mode in function of the result of the comparison of step b)v.

It is to be noted that the time period ($\Delta t$) used herein is the same time period as used for the evaluation of the throughput "T" in the above formula used to calculate Ro and may for example be a period of one month or of several months, typically of one year.

In step a), the values of expected failure detection rate (Rd) and/or of detectability (D) are initial values as for example set and input initially by a user in charge of performing the risk analysis. In some examples, the initial value of Rd is set and input by the user and D can be calculated by the user or by the computer executing the method, as explained hereinabove, or vice-versa. Alternatively, these values may be values as amended by the method itself (see step b.vi) in case of an iterative use of the method.

In some examples, step b) further comprises a step:

b)viii Triggering an alarm and/or providing an information to a user of the technical system if Nne≠$\Delta t \cdot Rd$ and/or if Ne≠$\Delta t \cdot (Ro-Rd)$.

In some examples of a method according to some embodiments, in step b)vi, the value of detectability (D) associated to said given failure mode is amended by either decreasing the value of the detectability (D) if Nne is greater than $\Delta t \cdot Rd$, or by increasing the value of the detectability (D) if Nne is smaller than $\Delta t \cdot Rd$, and/or by either increasing the value of the detectability (D) if Ne is greater than $\Delta t \cdot (Ro-Rd)$, or by decreasing the value of the detectability (D) if Ne is smaller than $\Delta t \cdot (Ro-Rd)$, and/or in step b)vi, the value of the expected failure detection rate (Rd) associated to said given failure mode is amended by either increasing the value of the expected failure detection rate (Rd) if Nne is greater than $\Delta t \cdot Rd$, or by decreasing the value of the expected failure detection rate (Rd) if Nne is smaller than $\Delta t \cdot Rd$, and/or by either decreasing the value of the expected failure detection rate (Rd) if Ne is greater than $\Delta t \cdot (Ro-Rd)$, or by increasing the value of the expected failure detection rate (Rd) if Ne is smaller than $\Delta t \cdot (Ro-Rd)$.

In some examples, the computer executing the method may amend the value of Rd associated with said given failure mode of said set of failure modes and calculate the corresponding value of D with the formula disclosed hereinabove, or vice versa.

According to a second aspect of the present disclosure, there is provided a computer program product storing executable instructions, which, when executed by a computer, cause the computer to perform the method disclosed herein.

The present disclosure has been described in terms of specific embodiments, which are illustrative of exemplary embodiments and not to be construed as limiting. More generally, it will be appreciated by persons skilled in the art that the present disclosure is not limited by what has been particularly shown and/or described hereinabove.

Reference numerals in the claims do not limit their protective scope. Use of the verbs "to comprise", "to include", "to be composed of", or any other variant, as well as their respective conjugations, does not exclude the presence of elements other than those stated. Use of the article "a", "an" or "the" preceding an element does not exclude the presence of a plurality of such elements.

The present disclosure may also be described as follows: a computer-based method for updating risk analysis parameters of a proactive risk analysis of a technical system, such as of an FMEA analysis for example. The method uses incident report data obtained during posterior operation of the technical system, compares these incident report data with data of the proactive risk analysis, and updates the said risk analysis parameters in function of said comparison.

The invention claimed is:

1. A computer-based method for updating risk analysis parameters associated with a failure modes and effects analysis (FMEA) of a technical system, operations performed by a computer according to the computer-based method comprising:

retrieving, from a memory, stored data from the FMEA analysis of the technical system, the stored data including:

a set of process steps for performance by the technical system during operation;

a set of failure modes associated with the performance of the process steps; and at least one of a value of an expected failure occurrence rate (Ro)—or a value of an occurrence (O), both the value of Ro and the value of O being associated with at least one given failure mode of the set of failure modes;

for the at least one given failure mode of the set of failure modes:

retrieving incidents from incident reports related to incidents which occurred during the performance of the process steps performed by the technical system during a given time period ($\Delta t$) subsequently to the FMEA analysis;

associating the at least one given failure mode with those of the retrieved incidents which are related to the at least one given failure mode;

classifying each incident of the retrieved incidents associated with the at least one given failure mode as classification data, the classification data including incidents classified as an event, a near event, or a non-event, wherein an incident is classified as a near event if it is an incident that occurred within the technical system during its operational use and which could have resulted in the technical system having an unwanted effect but wherein the unwanted effect did not occur, and storing the resulting classification data in the memory;

retrieving, from the memory, the classification data;

determining a sum (Ne+Nne) of a number of events (Ne) and of a number of near events (Nne), wherein the events and the near events are associated with the at least one given failure mode and occurred during the given time period (Δt);

performing a first comparison of the sum (Ne+Nne) with a value of Δt·Ro; and in the stored data of the FMEA analysis of the technical system, automatically amending at least one of the value of the occurrence rate (Ro) or the value of the occurrence (O), both the value of Ro and the value of O being associated with the at least one given failure mode based on a result of the comparison.

2. The computer-based method according to claim 1, the operations performed by the computer according to the computer-based method further comprising:

if (Ne+Nne)≠Δt·Ro, at least one of:
triggering an alarm; or
providing information to a user of the technical system.

3. The computer-based method according to claim 1, wherein:

automatically amending the value of the occurrence (O) includes increasing the value of the occurrence (O) if (Ne+Nne) is greater than Δt·Ro, or decreasing the value of the occurrence (O) if (Ne+Nne) is smaller than Δt·Ro, and automatically amending the value of the occurrence rate (Ro) includes increasing the value of the occurrence rate (Ro) if (Ne+Nne) is greater than Δt·Ro, or decreasing the value of the occurrence rate (Ro) if (Ne+Nne) is smaller than Δt·Ro.

4. The computer-based method according to claim 1, wherein:

the value of the occurrence (O) associated with the at least one given failure mode of the set of failure modes is derived from the value of the expected failure occurrence rate (Ro), or the value of the expected failure occurrence rate (Ro) associated with the at least one given failure mode of the set of failure modes is derived from the value of the occurrence (O) associated with the at least one given failure mode of the set of failure modes.

5. The computer-based method according to claim 1, wherein:

the stored data from the FMEA analysis of the technical system further includes at least one of a value of an expected failure detection rate (Rd) or a value of a detectability (D), both the value Rd and the value D being associated with the at least one given failure mode of the set of failure modes, the performing of a comparison is the performing of a first comparison, and the operations performed by the computer according to the computer-based method further comprising:

performing a second comparison of at least one of:
a number of near events (Nne) with a value of Δt·Rd; or
a number of events (Ne) with the value of Δt·(Ro−Rd); and automatically amending, based on a result of the second comparison, at least one of:
the value of the expected failure detection rate (Rd); or
the value of the detectability (D) associated with the at least one given failure mode.

6. The computer-based method according to claim 5, the operations performed by the computer according to the computer-based method further comprising:

if at least one of Nne≠Δt·Rd or Ne≠Δt·(Ro−Rd) is true, performing at least one of:
triggering an alarm; or
providing information to a user of the technical system.

7. The computer-based method according to claim 5, wherein:

automatically amending the value of detectability (D) includes at least one of:
decreasing the value of the detectability (D) if Nne is greater than Δt·Rd, or increasing the value of the detectability (D) if Nne is smaller than Δt·Rd; or
increasing the value of the detectability (D) if Ne is greater than Δt·(Ro−Rd) or decreasing the value of the detectability (D) if Ne is smaller than Δt·(Ro−Rd); and automatically amending the value of the expected failure detection rate (Rd) includes at least one of:
increasing the value of the expected failure detection rate (Rd) if Nne is greater than Δt·Rd, or decreasing the value of the expected failure detection rate (Rd) if Nne is smaller than Δt·Rd; or
decreasing the value of the expected failure detection rate (Rd) if Ne is greater than Δt·(Ro−Rd), or increasing the value of the expected failure detection rate (Rd) if Ne is smaller than Δt·(Ro−Rd).

8. The computer-based method according to claim 5, wherein:

the value of the detectability (D) associated with the at least one given failure mode of said set of failure modes is derived from the value of the expected failure detection rate (Rd), or the value of the expected failure detection rate (Rd) associated with the at least one given failure mode of said set of failure modes is derived from the value of the detectability (D).

9. The computer-based method according to claim 1, wherein associating the at least one given failure mode with those retrieved incidents which are related to the at least one given failure mode includes requesting a user to establish the associations and to input the associations into the computer.

10. The computer-based method according to claim 1, wherein classifying each incident associated with the at least one given failure mode as classification data includes requesting a user to establish the classification data for each incident associated with the at least one given failure mode and to input the classification data into the computer.

11. A non-transitory computer-readable medium storing executable instructions, which, when executed by a computer, cause the computer to:

retrieve, from a memory, stored data from a failure modes and effects analysis (FMEA) of a technical system, the stored data including:
a set of process steps for performance by the technical system;
a set of failure modes associated with the performance of the process steps; and
at least one of a value of an expected failure occurrence rate (Ro) or a value of an occurrence (O), both the value of Ro and the value of O being associated with at least one given failure mode of the set of failure modes; and for the at least one given failure mode of the set of failure modes:

retrieve incidents from incident reports related to incidents which occurred during the performance of the process steps performed by the technical system during a given time period ($\Delta t$) subsequently to the FMEA analysis;

associate the at least one given failure mode with those of the retrieved incidents which are related to the at least one given failure mode;

classify each of the retrieved incidents associated with the at least one given failure mode as classification data, the classification data including incidents classified as an event, a near event, or a non-event, wherein an incident is classified as a near event if it is an incident that occurred within the technical system during its operational use and which could have resulted in the technical system having an unwanted effect but wherein the unwanted effect did not occur, and storing the resulting classification data in the memory;

retrieve, from the memory, the classification data;

determine a sum ($Ne+Nne$) of a number of events ($Ne$) and of a number of near events ($Nne$), wherein the events and the near events are associated with the at least one given failure mode and occurred during the given time period ($\Delta t$);

perform a comparison of the sum ($Ne+Nne$) with a value of $\Delta t \cdot Ro$; and in the stored data from the FMEA analysis of the technical system, automatically amend at least one of the value of the occurrence rate ($Ro$) or the value of the occurrence ($O$), both the value of $Ro$ and the value of $O$ being associated with the at least one given failure mode, based on a result of the comparison.

\* \* \* \* \*